US012712218B2

(12) United States Patent
Lee et al.

(10) Patent No.: US 12,712,218 B2
(45) Date of Patent: Aug. 18, 2026

(54) BATTERY PACK, AND AUTOMOTIVE VEHICLE COMPRISING SAME

(71) Applicant: LG ENERGY SOLUTION, LTD., Seoul (KR)

(72) Inventors: Tae-Kyeong Lee, Daejeon (KR); Sung-Hoon Woo, Daejeon (KR); Young-Il Yoon, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 565 days.

(21) Appl. No.: 18/014,358

(22) PCT Filed: Aug. 13, 2021

(86) PCT No.: PCT/KR2021/010838

§ 371 (c)(1),
(2) Date: Jan. 4, 2023

(87) PCT Pub. No.: WO2022/035296

PCT Pub. Date: Feb. 17, 2022

(65) Prior Publication Data

US 2023/0261282 A1 Aug. 17, 2023

(30) Foreign Application Priority Data

Aug. 14, 2020 (KR) ........................ 10-2020-0102647

(51) Int. Cl.
*H01M 10/6556* (2014.01)
*H01M 10/613* (2014.01)
(Continued)

(52) U.S. Cl.
CPC ..... *H01M 10/6556* (2015.04); *H01M 10/613* (2015.04); *H01M 10/625* (2015.04);
(Continued)

(58) Field of Classification Search
CPC ........... H01M 10/6556; H01M 10/613; H01M 10/625; H01M 10/6567; H01M 50/204;
(Continued)

(56) References Cited

U.S. PATENT DOCUMENTS

2012/0121959 A1* 5/2012 Yamada ................ H01M 10/66
429/100
2013/0029198 A1 1/2013 Suzuki
(Continued)

FOREIGN PATENT DOCUMENTS

CN 102906899 A 1/2013
CN 107293662 A 10/2017
(Continued)

OTHER PUBLICATIONS

International Search Report (PCT/ISA/210) issued in PCT/KR2021/010838 mailed on Nov. 23, 2021.
(Continued)

*Primary Examiner* — Michael L Dignan
(74) *Attorney, Agent, or Firm* — Birch, Stewart, Kolasch & Birch, LLP

(57) ABSTRACT

A battery pack includes a plurality of battery modules; a cooling pipe configured to supply a cooling liquid to the plurality of battery modules; and a tray comprising a cooling liquid receiver into which a cooling liquid leaking out from the cooling pipe flows, the plurality of battery modules being seated on the tray.

11 Claims, 5 Drawing Sheets

(51) Int. Cl.
*H01M 10/625* (2014.01)
*H01M 10/6567* (2014.01)
*H01M 50/204* (2021.01)
*H01M 50/375* (2021.01)

(52) U.S. Cl.
CPC ..... *H01M 10/6567* (2015.04); *H01M 50/204* (2021.01); *H01M 50/375* (2021.01); *H01M 2220/20* (2013.01)

(58) Field of Classification Search
CPC ........... H01M 50/375; H01M 2220/20; H01M 50/211; H01M 50/249; H01M 50/20; H01M 2200/10; Y02E 60/10
See application file for complete search history.

(56) References Cited

U.S. PATENT DOCUMENTS

| | | | | |
|---|---|---|---|---|
| 2017/0104252 | A1* | 4/2017 | Wünsche | H01M 10/647 |
| 2017/0365887 | A1 | 12/2017 | Kwon et al. | |
| 2018/0062228 | A1 | 3/2018 | Wuensche et al. | |
| 2018/0154754 | A1* | 6/2018 | Rowley | B60K 1/04 |
| 2018/0351222 | A1 | 12/2018 | Min | |
| 2018/0358593 | A1 | 12/2018 | Seo et al. | |
| 2019/0312322 | A1 | 10/2019 | Ahn et al. | |
| 2020/0227796 | A1 | 7/2020 | Miki | |
| 2021/0066679 | A1* | 3/2021 | Chen | H01M 50/691 |
| 2021/0119282 | A1* | 4/2021 | Wünsche | H01M 10/647 |
| 2021/0129684 | A1* | 5/2021 | Wuensche | H01M 10/6557 |
| 2021/0175572 | A1* | 6/2021 | He | H01M 10/647 |

FOREIGN PATENT DOCUMENTS

| | | | |
|---|---|---|---|
| CN | 209087962 | U | 7/2019 |
| CN | 209963138 | U | 1/2020 |
| DE | 10 2017 005 314 | A1 | 12/2018 |
| JP | 2014-192044 | A | 10/2014 |
| JP | 2018-55972 | A | 4/2018 |
| JP | 2018-535528 | A | 11/2018 |
| JP | 2020-113416 | A | 7/2020 |
| KR | 10-2014-0037305 | A | 3/2014 |
| KR | 10-2017-0142442 | A | 12/2017 |
| KR | 10-2018-0006150 | A | 1/2018 |
| KR | 10-2018-0025810 | A | 3/2018 |
| KR | 10-2018-0080685 | A | 7/2018 |
| KR | 10-2018-0083140 | A | 7/2018 |
| KR | 10-2019-0131415 | A | 11/2019 |

OTHER PUBLICATIONS

Extended European Search Report for European Application No. 21856302.1, dated Jun. 12, 2024.

* cited by examiner

BATTERY PACK, AND AUTOMOTIVE VEHICLE COMPRISING SAME

TECHNICAL FIELD

The present disclosure relates to a battery pack, and a vehicle including the same. More particularly, the present disclosure relates to a battery pack having a space in which, when leakage occurs in a cooling line through which a cooling liquid flows, the leaking cooling liquid may be stored to prevent an accident such as a short-circuit between battery modules due to the leaking cooling liquid, and a vehicle including the battery pack.

The present application claims priority to Korean Patent Application No. 10-2020-0102647 filed on Aug. 14, 2020 in the Republic of Korea, the disclosures of which are incorporated herein by reference.

BACKGROUND ART

As the demand for portable electronic products such as laptops, video cameras, and mobile phones has recently rapidly increased and the development of electric vehicles, energy storage batteries, robots, satellites, etc. has begun in earnest, research on high-performance secondary batteries capable of repeated charge/discharge has been actively conducted.

Currently commercialized secondary batteries include nickel cadmium batteries, nickel hydride batteries, nickel zinc batteries, and lithium secondary batteries. Among them, lithium secondary batteries are in the spotlight because they have almost no memory effect compared to nickel-based secondary batteries, and thus have advantages of free charge/discharge, very low self-discharge rate, and high energy density.

A lithium secondary battery mainly uses a lithium-based oxide and a carbon material as a positive electrode active material and a negative electrode active material, respectively. Also, the lithium secondary battery includes an electrode assembly in which a positive electrode plate and a negative electrode plate to which the positive electrode active material and the negative electrode active material are respectively applied are located with a separator therebetween, and a casing, that is, a battery case, for sealing and accommodating the electrode assembly along with an electrolytic solution.

According to a shape of a casing, lithium secondary batteries may be classified into can-type secondary batteries in which an electrode assembly is received in a metal can, and pouch-type secondary batteries in which an electrode assembly is received in a pouch of an aluminum laminate sheet.

In particular, the demand for large-capacity battery packs applied to electric vehicles and the like has recently increased. Because such large capacity battery packs include a plurality of battery modules, when fire or thermal runaway occurs in some of the plurality of battery modules, propagation of the fire or the thermal runaway to other adjacent battery modules occurs. Accordingly, the safety of a battery pack has become problematic.

Furthermore, a battery pack mounted in a vehicle needs to handle large impact caused by vehicle collision. Accordingly, the battery pack needs to solve the problems such as damage to internal elements or fire or explosion of secondary batteries due to external impact. In particular, when a cooling member is damaged, a cooling liquid inside the cooling member may leak out and may cause an electrical short-circuit between battery modules.

DISCLOSURE

Technical Problem

The present disclosure is designed to solve the problems of the related art, and therefore the present disclosure is directed to preventing a short-circuit due to leakage of a cooling liquid in a cooling liquid passage and accumulation of the cooling liquid inside a pack housing.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

A battery pack according to an aspect of the present disclosure includes: a plurality of battery modules: a cooling pipe configured to supply a cooling liquid to the plurality of battery modules; and a tray including a cooling liquid receiver into which a cooling liquid leaking out from the cooling pipe flows, the plurality of battery modules being seated on the tray.

The battery pack may further include a pair of side covers covering opposite end portions in a width direction of the tray.

The pair of side covers may include main body portions extending in a longitudinal direction of the tray and respectively located on a first side and a second side in the width direction of the tray.

At least one of the pair of side covers may further include a pipe receiver extending inward from an inner wall of the main body portion, and surrounding the cooling pipe to accommodate the cooling pipe therein.

The cooling liquid receiver may include a cooling liquid inlet, wherein the cooling liquid inlet is formed in the pipe receiver.

The tray may include: a mount plate directly contacting the battery module, and having an end portion in a width direction spaced apart from the main body portion of the at least one of the pair of side covers to form a cooling liquid inlet through which the leaking cooling liquid flows into the cooling liquid receiver; and a base plate spaced apart from a lower portion of the mount plate to form the cooling liquid receiver in which the cooling liquid flowing through the cooling liquid inlet is accommodated.

The pipe receiver may be coupled to the mount plate and the main body portion of the at least one of the pair of side covers.

Each of the plurality of battery modules may include a fixing portion formed on at least one side.

Each of the plurality of battery modules may be fixed to at least one of the pair of side covers through the fixing portion.

A vehicle according to another aspect of the present disclosure includes at least one battery pack.

A gas discharge portion may be above the pipe receiver.

Each of the plurality of battery modules may have a discharge port, wherein the gas discharge portion may have a plurality of inlets and each discharge port may communicate with a respective one of the plurality of inlets.

A front frame may be connected to the tray and an outlet may be formed in the front frame, wherein the gas discharge portion may communicate with the outlet.

Advantageous Effects

According to an aspect of the present disclosure, it is possible to prevent a short-circuit due to leakage of a cooling liquid in a cooling liquid passage and accumulation of the cooling liquid inside a pack housing.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

FIG. 7 is an enlarged bottom view illustrating a discharge port of FIG. 6.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the present disclosure, so it should be understood that other equivalents and modifications could be made thereto without departing from the scope of the present disclosure.

Figure 1:
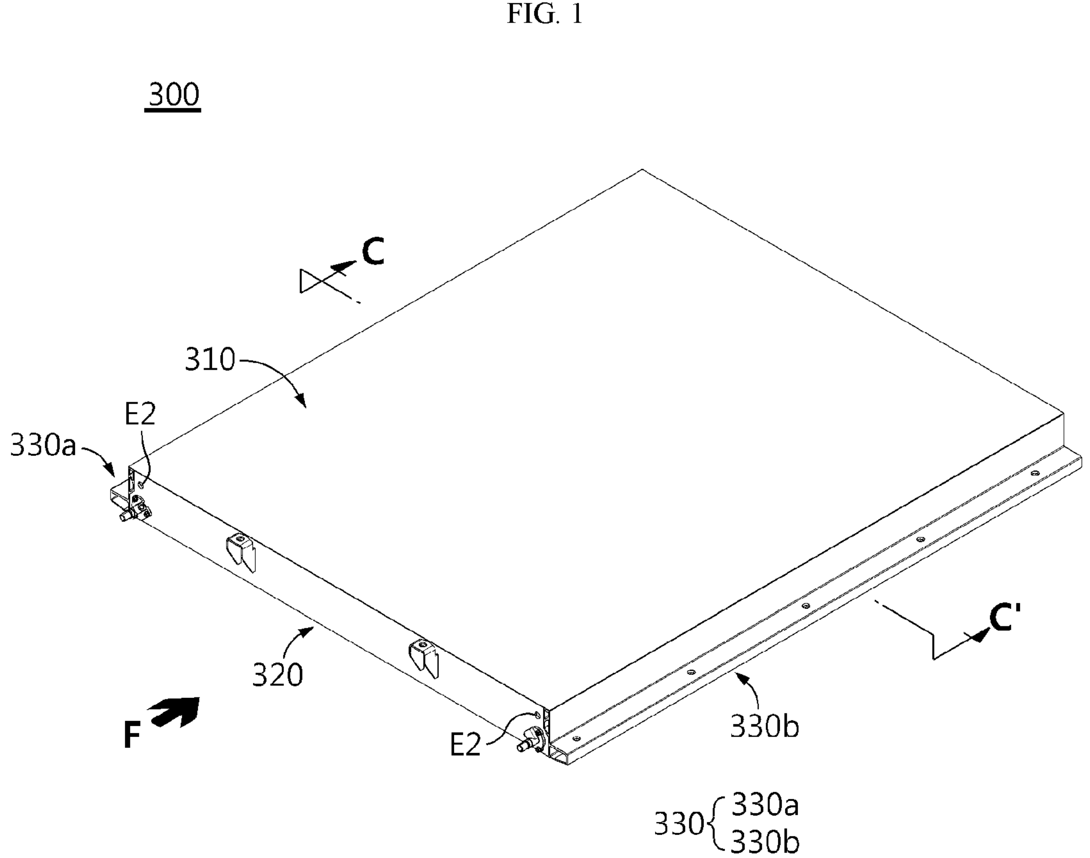
FIG. 1 is an assembled perspective view illustrating a battery pack according to an embodiment of the present disclosure.
Figure 2:
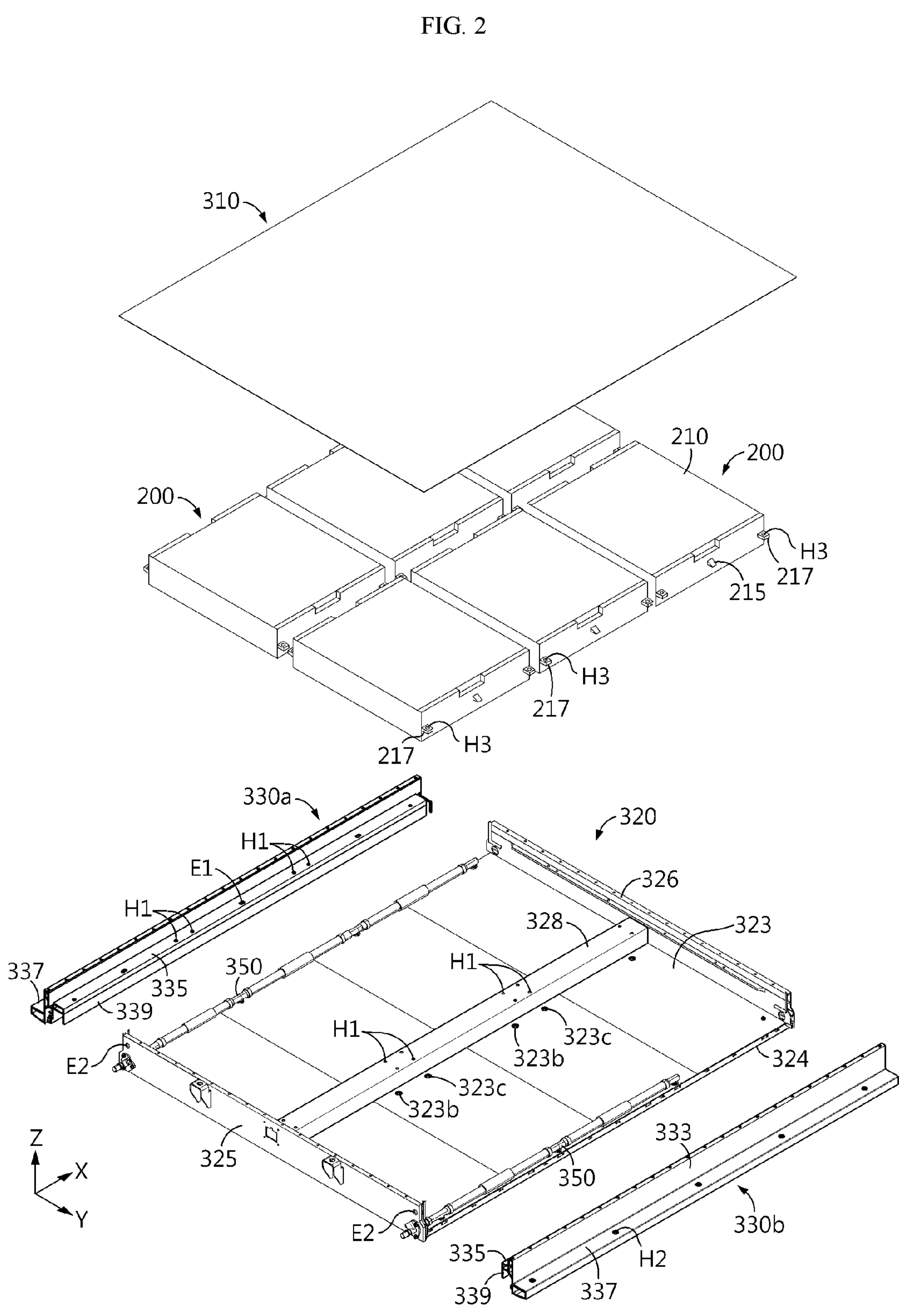
FIG. 2 is an exploded perspective view illustrating a battery pack according to an embodiment of the present disclosure.
Figure 3:
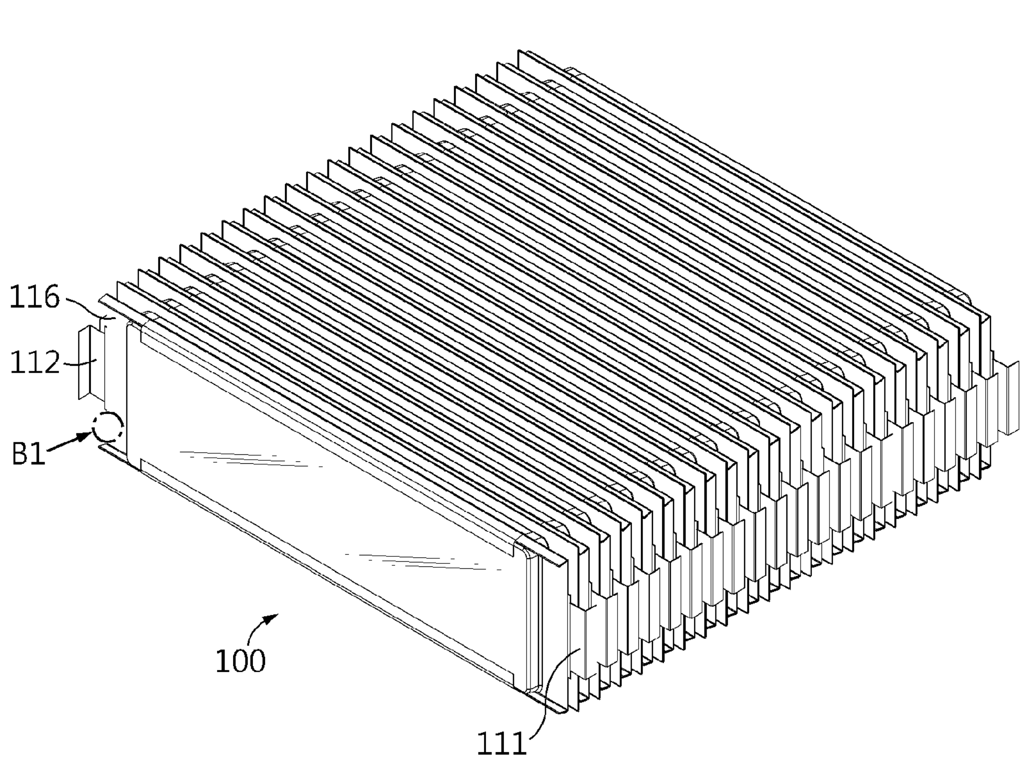
FIG. 3 is a perspective view illustrating a cell stack in which a plurality of secondary batteries applied to a battery pack are stacked according to an embodiment of the present disclosure.

Referring to FIGS. 1 through 3, a battery pack 300 according to an embodiment of the present disclosure includes a plurality of battery modules 200, a cooling pipe 350, and a tray 320. The battery pack 300 may further include an upper cover 310 and/or a pair of side covers 330 (330*a* and 330*b*) in addition to the above elements. The upper cover 310 and/or the pair of side covers 330 (330*a* and 330*b*) may be coupled to the tray 320 to form one pack housing in which the battery modules 200 are accommodated.

In detail, each of the battery modules 200 may include a plurality of secondary batteries 100. Each of the secondary batteries 100 may be a pouch-type secondary battery including an electrode assembly (not shown), an electrolytic solution (not shown), and a pouch case 116 in which the electrode assembly and the electrolytic solution are accommodated. For example, as shown in FIG. 3, when viewed in an F direction (see FIG. 1), inside one battery module 200, 21 pouch-type secondary batteries 100 that are stacked in a longitudinal direction (direction parallel to an X-axis) of the battery pack 300 may be accommodated in a module housing 210. However, this is merely an example, and the number of the secondary batteries 100 may vary according to required capacity and voltage.

Also, as shown in FIG. 3, a positive electrode lead 112 and a negative electrode lead 111 may be drawn out in opposite directions in a width direction (direction parallel to a Y-axis) of the battery pack 300. That is, the positive electrode lead 112 may be provided on an end portion with respect to the center of the secondary battery 100. Also, the negative electrode lead 111 may be provided on the other end portion with respect to the center of the secondary battery 100.

The secondary battery 100 may be provided so that a body is erected perpendicular to a horizontal plane (X-Y plane). The body of the secondary battery 100 may longitudinally extend in the width direction (direction parallel to the Y-axis) of the battery pack 300. Also, the plurality of secondary batteries 100 may be configured to, when abnormality such as fire or thermal runaway occurs, discharge gas to one side and/or the other side in the width direction of the battery pack 300. For example, when the secondary battery 100 is a pouch-type battery cell, a portion B1 of a sealing portion on a side or the other side in a longitudinal direction of the pouch case 116 may have a weak sealing force. Alternatively, the portion of the sealing portion on the side or the other side in the longitudinal direction of the pouch may have a sealing area less than that of the other portion.

Accordingly, when abnormality occurs, the plurality of secondary batteries 100 may discharge gas to one side and/or the other side in the longitudinal direction, and thus may discharge the gas in the battery module 200 in a desired direction (direction toward a discharge port described below). Accordingly, gas may be smoothly discharged to the outside without being stagnant inside the battery module 200, and thus a secondary explosion or a larger fire inside the battery module 200 may be effectively prevented.

However, only the pouch-type battery cell 100 may not be applied to the battery pack 300 according to the present disclosure, and various types of battery cells known at the time of filing the present application may be employed.

The battery pack 300 may include at least one bus bar (not shown) configured to electrically connect the plurality of secondary batteries 100 to one another. In detail, the bus bar may include a conductive metal, for example, copper, aluminum, or nickel.

Furthermore, the battery pack 300 may include a wire-type bus bar (not shown) for electrically connecting the plurality of battery modules 200 to one another.

Each of the plurality of battery modules 200 may include a discharge port 215. The discharge port 215 may have an opening through which gas generated inside the battery module 200 is discharged to the outside. It is preferable that the discharge port 215 is formed only on an end portion of the battery module 200. It is preferable that the discharge port 215 is formed only on an end portion close to an outer surface of the battery pack 300 from among both end portions in a longitudinal direction (direction parallel to the Y-axis) of the battery module 200. This is to prevent a phenomenon where temperature rise is accelerated when a pair of battery modules 200 facing each other discharge gas toward each other.

That is, in the battery pack 300 according to the present disclosure, a pair of battery modules 200 are located on the try 320 to face each other in the width direction (direction parallel to the Y-axis) of the battery pack 300, and two or more battery modules 200 are continuously arranged in the longitudinal direction (direction parallel to the X-axis) of the battery pack 300. When the battery pack 300 has a structure in which the battery modules 200 facing each other discharge high-temperature gas toward each other, a temperature inside the battery pack 300 may rise. Accordingly, a position of the discharge port 215 is limited to a position at which high-temperature gas may be discharged to the outside of the battery pack 300.

The discharge port 215 may have a tubular shape protruding toward the side cover 330. A tubular end portion of the discharge port 215 may be connected to an inlet E1 to communicate with the inside of the side cover 330.

The plurality of battery modules 200 may be seated on the tray 320. The tray 320 may include a mount plate 323 extending in a horizontal direction (direction parallel to the X-Y plane). Also, the tray 320 may include a base plate 324 coupled to a lower portion of the mount plate 323. The tray 320 may include a front frame 325 and a rear frame 326 each having a plate shape erected in an up-down direction (direction parallel to a Z-axis). The front frame 325 may be coupled to an end portion in a longitudinal direction (direction parallel to the X-axis) of the mount plate 323. The rear frame 326 may be coupled to the other end portion in the longitudinal direction (direction parallel to the X-axis) of the mount plate 323.

The tray 320 may include an outlet E2 through which gas is discharged to the outside. For example, as shown in FIG. 2, the outlet E2 may be formed on both end portions in a longitudinal direction (direction parallel to the Y-axis) of the front frame 325. The outlet E2 may be open so that the inside and the outside of the battery pack 300 communicate with each other.

The upper cover 310 may be coupled to the top of the tray 320. The upper cover 310 has a size large enough to cover all of the plurality of battery modules 200 mounted on the tray 320.

Figure 4:
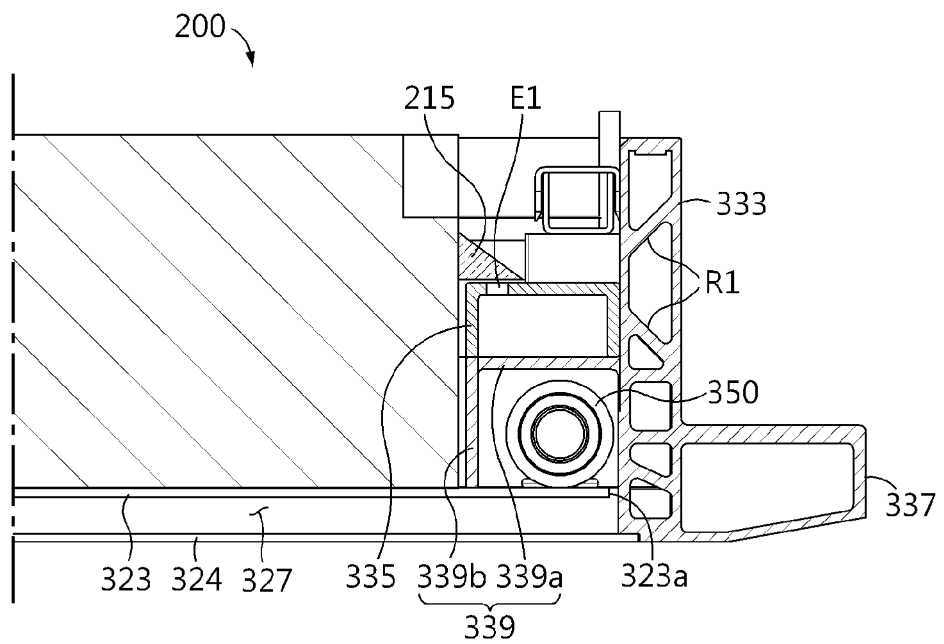
FIG. 4 is a partial cross-sectional view taken along line C-C of the battery pack of FIG. 1.

Referring to FIG. 4 together with FIG. 2, the side cover 330 may longitudinally extend in one direction (Y-axis direction). The side cover 330 may be formed by using extrusion molding. An end portion in a longitudinal direction of the side cover 330 may be coupled to the front frame 325. The other end portion in the longitudinal direction of the side cover 330 may be coupled to the rear frame 326.

Furthermore, the side covers 330 may be located on an end portion and the other end portion in a width direction (direction parallel to the Y-axis) of the mount plate 323 of the tray 320. For example, as shown in FIGS. 2 and 4, two side covers 330 may include main body portions 333 respectively located on an end portion and the other end portion in the width direction of the mount plate 323. Accordingly, the main body portions 333 may function as a left wall and a right wall of the battery pack 300. The main body portions 333 may extend in a front-rear direction (direction parallel to the X-axis). For example, the main body portions 333 may have a plate shape extending in the front-rear direction through extrusion molding. The main body portions 333 may be erected in the up-down direction (direction parallel to the Z-axis). The main body portions 333 may have a hollow shape with an empty inside.

Also, the side cover 330 may include the inlet E1 formed by opening a portion. For example, the inlet E1 may be formed by opening a portion of a gas discharge portion 335 described below. The outside and the inside of the side cover 330 communicate with each other through the inlet E1. Each of a plurality of inlets E1 may be connected to the discharge port 215. That is, the inlet E1 faces the opening of the discharge port 215, and thus a gas passage formed in the gas discharge portion 335 and the discharge port 215 communicate with each other.

Furthermore, the gas discharge portion 335 may have a shape extending in one direction to transfer gas introduced from the inlet E1 to the outlet E2. The gas discharge portion 335 may be formed on a side of the main body portion 333. The gas discharge portion 335 may have a shape extending from a side of the main body portion 333 to the battery module 200. The gas discharge portion 335 have a tubular shape extending in the front-rear direction and having an empty inside through extrusion molding. For example, as shown in FIG. 2, each of two side covers 330 may include the gas discharge portion 335, and the gas discharge portion 335 may extend in the front-rear direction. A front end portion of the gas discharge portion 335, that is, an end portion in the longitudinal direction (direction parallel to the X-axis), may be connected to the outlet E2 provided in the front frame 325.

The gas discharge portion 335 may be located over a pipe receiver 339 described below. Accordingly, the gas discharge portion 335 may be provided in an empty space of the battery pack 300 in the up-down direction (Z-axis direction), and thus the energy density of the battery pack 300 may be improved. However, in the battery pack 300 of the present disclosure, the side cover 330 may include only the pipe receiver 339 without the gas discharge portion 335.

As described above, the side covers 330 may include the main body portions 333 longitudinally extending in one direction and respectively located on a side and the other side of the tray 320, the plurality of E1 formed by opening portions and each connected to the discharge port 215, and the gas discharge portion 335 configured to transfer gas introduced from the inlet E1 to the outlet E2. Accordingly, the battery pack 300 according to the present disclosure may discharge high-temperature gas generated due to abnormality such as fire or thermal runaway in any one of the plurality of battery modules 200 to the outside through the gas discharge portion 335 without increasing a temperature of an adjacent battery module 200, thereby improving safety in the use of the battery pack 300.

As described above, according to the present disclosure, because high-temperature gas generated from the battery module 200 may be transferred to the side cover 330 located opposite to an adjacent battery module 200, temperature rise of the adjacent battery module 200 due to the high-temperature gas may be minimized. Accordingly, when fire or thermal runaway occurs in one battery module 200, propagation of the fire or thermal runaway to other adjacent battery modules 200 may be effectively prevented.

Furthermore, because the side covers 330 are located on a side or the other side in the width direction of the tray 320, the plurality of battery modules 200 may be protected from impact in the front-rear direction and a left-right direction. Accordingly, the stability of the battery pack 300 may be improved.

Figure 5:
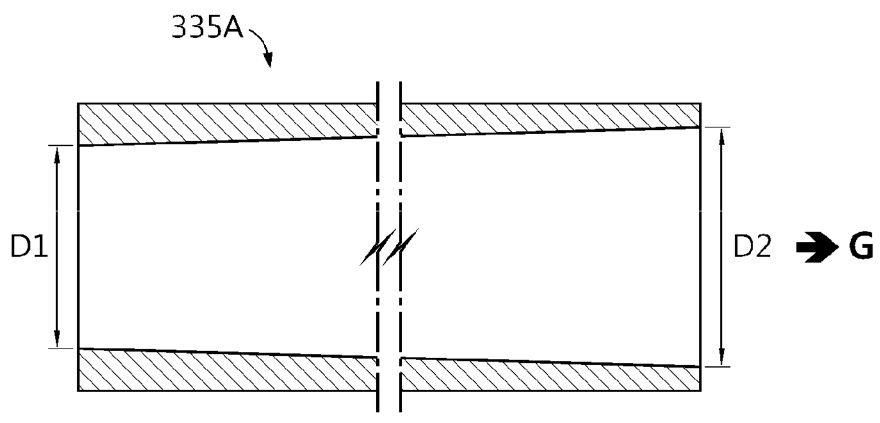
FIG. 5 is a partial cross-sectional view illustrating a gas discharge portion of a battery pack according to an embodiment of the present disclosure.

FIG. 5 is a partial cross-sectional view illustrating a gas discharge portion of a battery pack according to an embodiment of the present disclosure.

Referring to FIG. 5 together with FIGS. 2 and 4, a gas discharge portion 335A applied to the present disclosure may be formed so that a cross-sectional area of an inner tube increases toward the outlet E2 of the tray 320. That is, in the gas discharge portion 335A, an inner diameter D1 of the inner tube located far from the outlet E2 of the tray 320 may be less than an inner diameter D2 of the inner tube located close to the outlet E2.

Accordingly, the internal pressure of a portion of the gas discharge portion 335A close to the outlet E2 may be less than that of a portion far from the outlet E2. Accordingly, gas introduced into the gas discharge portion 335A may be guided to move to the outlet E2 of the gas discharge portion 335A where relatively low pressure is created.

According to this configuration of the present disclosure, gas may be smoothly discharged, thereby improving safety in the use of the battery pack 300.

Referring back to FIG. 4 together with FIG. 2, inside the main body portion 333 of the side cover 330, an inner space surrounded by an outer wall may be formed. A reinforcing rib R1 extending from an inner surface to the other inner surface may be provided in the inner space. For example, as shown in FIG. 4, the inner space surrounded by the outer wall may be formed inside the main body portion 333 of the side cover 330. At least one reinforcing rib R1 may be provided in the inner space to extend from an inner surface to the other inner surface.

The reinforcing rib R1 may longitudinally extend from an end portion to the other end portion in a longitudinal direction (direction parallel to the X-axis) of the main body portion 333. The reinforcing rib R1 may be provided on the gas discharge portion 335, a mount portion 337 described below, and the pipe receiver 339 as well as the main body portion 333 of the side cover 330. That is, the gas discharge portion 335, the mount portion 337, and the pipe receiver 339 which are elements of the side cover 330 may protect the battery module 200 and other elements by securing additional rigidity through the reinforcing rib R1 when external impact of the battery pack 300 occurs.

As such, according to the present disclosure, because the reinforcing rib R1 is formed in the inner space of the side cover 330, the mechanical rigidity of the side cover 330 may be effectively increased. Accordingly, the battery pack 300 may safely protect the plurality of battery modules 200 and other elements from external impact in the left-right direction and the front-rear direction.

Figure 6:
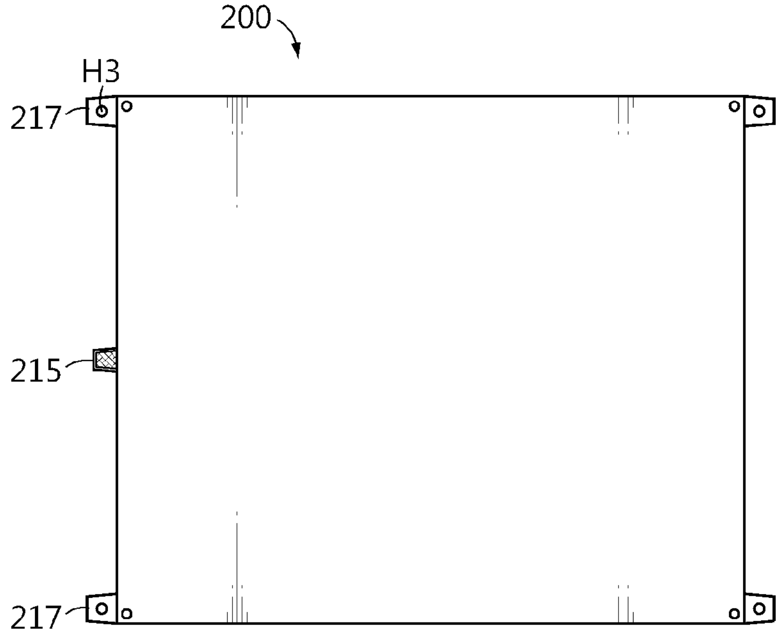
FIG. 6 is a bottom view illustrating a battery module applied to a battery pack according to an embodiment of the present disclosure.

FIG. 6 is a bottom view illustrating a battery module of a battery pack according to an embodiment of the present disclosure.

Referring back to FIGS. 2 and 6, the battery module 200 of the present disclosure may include at least one fixing portion 217 formed on at least one side. Each of the plurality of battery modules 200 may be fixed to at least one of the pair of side covers 330 through the fixing portion 217. The fixing portion 217 may be provided on, for example, the module housing 210. In detail, the battery module 200 may include the module housing 210. The module housing 210 may have an inner space in which the plurality of secondary batteries 100 are accommodated. The module housing 210 may include the fixing portion 217 to be coupled to the side cover 330. The fixing portions 217 are provided on a side and on the other side in a longitudinal direction (direction parallel to the Y-axis) of the module housing 210.

A coupling hole H3 is formed in the fixing portion 217. A fastening hole H1 is formed in the side cover 330 at a position corresponding to the coupling hole H3. In detail, the fastening hole H1 is formed in the gas discharge portion 335 of the side cover 330. That is, a plurality of fastening holes H1 and inlets E1 are provided in a top surface of the gas discharge portion 335 to be spaced apart from each other in a longitudinal direction (direction parallel to the X-axis) of the gas discharge portion 335.

A pair of outer fixing portions 217 provided on a pair of battery modules 200 facing each other may be coupled to the gas discharge portion 335 by a fastening bolt (not shown) inserted into the fastening hole H1 and the coupling hole H3. In order to fix a pair of inner fixing portions 217 respectively provided on a pair of battery modules 200 facing each other, that is, a pair of fixing portions 217 facing each other, to the tray 320, a separate structure provided on the tray 320 is additionally required.

To this end, a module fixing bar 328 having the same height of the gas discharge portion 335 and having a shape extending across a top surface of the tray 320 in a longitudinal direction (direction parallel to the X-axis) of the tray 320 is additionally provided on a central portion in a width direction (direction parallel to the Y-axis) of the tray 320. A pair of fastening holes H1 are provided in a top surface of the module fixing bar 328 in a width direction (direction parallel to the Y-axis) of the module fixing bar 328, and a pair of fixing portions 217 respectively provided on a pair of battery modules 200 facing each other are fastened to the fastening holes H1.

As such, in the present disclosure, the battery module 200 and the tray 320 may be fastened to each other by using a method of indirectly fastening the battery module 200 by using a separate structure provided on the mount plate 323, instead of a method of directly fastening the battery module 200 to a bottom surface of the tray 320, that is, the mount plate 323. Accordingly, concentration of stress on the bottom surface of the tray 320 due to the fastening between the battery module 200 and the tray 320 may be prevented, and thus the loss of a cooling liquid flowing through a cooling liquid passage formed in the bottom surface of the tray 320 due to external impact which causes cooling performance degradation may be prevented. Also, when the cooling liquid flowing through the cooling liquid passage is cooling water, the risk of a short-circuit due to leakage of the cooling water may also be eliminated.

That is, the battery pack 300 according to the present disclosure may include a cooling liquid inlet **323*b* and a cooling liquid outlet 323*c* formed in the mount plate 323 constituting the bottom surface of the tray 320, and the battery module 200 may be connected to the cooling liquid inlet 323*b* and the cooling liquid outlet 323*c* through the bottom surface to receive and discharge a coolant. That is, the cooling liquid inlet 323*b* and the cooling liquid outlet 323*c* communicate with a cooling liquid passage (not shown) formed in the mount plate 323 constituting the bottom surface of the tray 320, and the cooling liquid passage communicates with a cooling pipe 350** described below.

Referring back to FIGS. 1, 2, and 4, the battery pack 300 includes the cooling pipe 350 inside which a cooling liquid flows. The cooling pipe 350 is configured to supply a cooling liquid to the plurality of battery modules 200. The cooling liquid may be, for example, cooling water.

Also, at least one of the pair of side covers 330 may further include the pipe receiver 339 extending inward from an inner wall of the main body portion 333. The pipe receiver 339 surrounds the cooling pipe 350 so that the cooling pipe 350 is accommodated inside the pipe receiver 339. The pipe receiver 339 may have an outer wall formed to surround the cooling pipe 350. The pipe receiver 339 is coupled to the mount plate 323 and the main body portion 333. The pipe receiver 339 may be coupled to the mount plate 323 and/or the main body portion 333 by using, for example, welding. Alternatively, the pipe receiver 339 and the main body portion 333 may be integrally formed with each other. Accordingly, an inner space of the pipe receiver 339, that is, a space surrounded by the pipe receiver 339, and the mount plate 323 and the main body portion 333, is substantially completely isolated from a receiving space of the battery module 200. Accordingly, even when a cooling liquid due to leakage exists in the inner space of the pipe receiver 339, the cooling liquid may not flow into the receiving space of the battery module 200.

As shown in FIG. 4, the outer wall of the pipe receiver 339 may include a horizontal plate 339*a* extending inward from an inner wall of the main body portion 333, and a vertical plate 339*b* extending downward from an end portion of the horizontal plate 339*a*. The horizontal plate 339*a* and the vertical plate 339*b* may be individually provided and fastened to each other by using welding or the like, or may be integrally formed with each other.

As such, according to the present disclosure, because the side cover 330 includes the pipe receiver 339 inside which the cooling pipe 350 is accommodated, damage to the cooling pipe 350 due to external impact may be prevented.

Referring back to FIG. 4, the tray 320 includes a cooling liquid receiver 327. In detail, the cooling liquid receiver 327 may be configured so that, when a cooling liquid leaks out from the cooling pipe 350, the leaking cooling liquid flows into the cooling liquid receiver 327. For example, as shown in FIG. 4, the cooling liquid receiver 327 may be formed in a space between the mount plate 323 and the base plate 324.

An end portion 323*a* in the longitudinal direction of the mount plate 323 is spaced apart from the main body portion 333 of the side cover 330 to provide a cooling liquid inlet functioning as a passage through which a leaking cooling liquid may flow in. That is, when a cooling liquid leaks out from the cooling pipe 350, the leaking cooling liquid may flow into the cooling liquid receiver 327 through a gap between the end portion 323*a* of the mount plate 323 and the side cover 330. The cooling liquid inlet of the cooling liquid receiver 327 is formed in the pipe receiver 339. Accordingly, even when a cooling liquid leaks out from the cooling pipe 350 located in the pipe receiver 339, the cooling liquid may flow into the cooling liquid receiver 327 without being accumulated in the pipe receiver 339. As such, in the battery pack 300 of the present disclosure, because the inner space of the pipe receiver 339 is completely isolated from the receiving space of the battery module 200 and the cooling liquid inlet is located in the pipe receiver 339, even when leakage occurs in the pipe receiver 339, the possibility that a leaking cooling liquid flows into the receiving space of the battery module 200 may be completely blocked.

As such, because the tray 320 includes the cooling liquid receiver 327 configured to, when a cooling liquid leaks out from the cooling pipe 350, cause the leaking cooling liquid to flow thereinto, the leaking cooling liquid may be prevented from being accumulated in the receiving space of the battery module 200 or from being introduced into the battery module 200, thereby preventing a short-circuit of the battery module 200.

Referring back to FIG. 2, the side cover 330 may further include the mount portion 337. The mount portion 337 may be provided outside the main body portion 333 to be coupled to an external device. A fastening structure may be formed so that the mount portion 337 is coupled to an external device. For example, the mount portion 337 may be coupled to a body of a vehicle. A bolting hole H2 into which a bolt is inserted may be formed in the mount portion 337.

As such, according to the present disclosure, because the mount portion 337 is further included, the battery pack 300 may be stably fixed to, for example, the body of the vehicle.

Also, the mount portion 337 may be configured to protect the plurality of battery modules 200 located thereinside from external impact. To this end, the mount portion 337 may protrude outward from the main body portion 333. The mount portion 337 may have a hollow structure having an empty inside. That is, the mount portion 337 may protrude outward to, when impact is applied from a side of the battery pack 300, absorb or respond to the impact.

Figure 7:
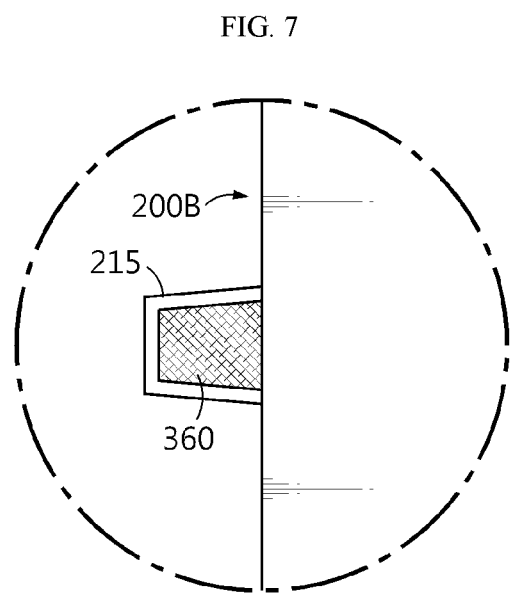

Referring to FIG. 7 together with FIGS. 4 and 6, in a battery module 200B applied to a battery pack according to another embodiment of the present disclosure, a stopper 360 may be provided on the discharge port 215. The stopper 360 may seal an outlet of the discharge port 215 below a certain temperature. The stopper 360 may be configured to be melted and lost at the certain temperature or higher. For example, the stopper 360 may include a material whose melting point is equal to or higher than 200° C. For example, the stopper 360 may include a paraffin material. The stopper 360 may be melted and lost, for example, at 200° C., to open the discharge port 215.

As such, because the battery module 200B of the present disclosure includes the stopper 360 configured to seal the discharge port 215 below a certain temperature and open the discharge port 215 by being melted and lost at the certain temperature or higher, high-temperature gas of the battery module 200B in which fire or thermal runaway occurs may cause the stopper 360 to be melted and lost, and thus the discharge port 215 may be opened to discharge the high-temperature gas to the outside. Because the discharge port 215 may be sealed in a normal use state in which an internal temperature equal to or higher than the certain temperature is maintained, an external material (particularly, a conductive material) may be prevented from being introduced into the battery module 200B.

Furthermore, because the battery module 200B of the present disclosure uses the stopper 360, when high-temperature gas is discharged from the battery module 200B in which fire or thermal runaway occurs, the gas moving to the gas discharge portion 335 may be prevented from being introduced into the battery module 200B through the discharge port 215 of another adjacent battery module 200B.

The battery pack 300 according to an embodiment of the present disclosure may further include various devices (not shown) for controlling charging and discharging of the battery module 200, for example, a battery management system (BMS), a current sensor, and a fuse.

A vehicle according to an embodiment of the present disclosure may be an electric vehicle or a hybrid vehicle, and includes at least one battery pack 300 according to the present disclosure as described above. That is, the vehicle according to an embodiment of the present disclosure may mount the battery pack 300 according to an embodiment of the present disclosure in a body of the vehicle. In this case, the side cover 330 may be coupled to the body of the vehicle.

It will be understood by one of ordinary skill in the art that when terms indicating directions such as upper, lower, left, right, front, and rear are used, these terms are only for convenience of explanation and may vary according to a position of an target object, a position of an observer, etc.

The present disclosure has been described in detail. However, it should be understood that the detailed description and specific examples, while indicating preferred embodiments of the present disclosure, are given by way of illustration only, since various changes and modifications within the scope of the present disclosure will become apparent to those skilled in the art from this detailed description.

What is claimed is:

1. A battery pack comprising:

a plurality of battery modules;

a cooling pipe configured to supply a cooling liquid to the plurality of battery modules;

a tray comprising a cooling liquid receiver into which a cooling liquid leaking out from the cooling pipe flows, the plurality of battery modules being seated on the tray;

a pair of side covers covering opposite end portions in a width direction of the tray; and a pipe receiver coupled to the tray and surrounding the cooling pipe to accommodate the cooling pipe therein, wherein the cooling liquid receiver comprises a cooling liquid inlet formed in the tray to provide direct fluid communication with the pipe receiver and through which the cooling liquid leaking out from the cooling pipe flows into the cooling liquid receiver, and wherein the tray further comprises:

a mount plate directly contacting the plurality of battery modules, and having an end portion in a width direction spaced apart from the pair of side covers forming the cooling liquid inlet; and a base plate spaced apart from a lower portion of the mount plate and forming the cooling liquid receiver in which the cooling liquid flowing through the cooling liquid inlet is accommodated.

2. The battery pack of claim 1, wherein the pair of side covers comprise main body portions extending in a longitudinal direction of the tray and respectively located on a first side and a second side of the tray.

3. The battery pack of claim 2, wherein the pipe receiver is configured in at least one of the pair of side covers and extends inward from an inner wall of the main body portion.

4. The battery pack of claim 1, wherein the pipe receiver is coupled to the mount plate and the main body portion of the at least one of the pair of side covers.

5. The battery pack of claim 1, wherein each of the plurality of battery modules comprises a fixing portion formed on at least one side.

6. The battery pack of claim 5, wherein each of the plurality of battery modules is fixed to at least one of the pair of side covers through the fixing portion.

7. A vehicle comprising at least one battery pack according to claim 1.

8. The battery pack of claim 1, further comprising a gas discharge portion above the pipe receiver.

9. The battery pack of claim 8, wherein each of the plurality of battery modules has a discharge port, wherein the gas discharge portion has a plurality of inlets; and wherein each discharge port communicates with a respective one of the plurality of inlets.

10. The battery pack of claim 8, further comprising a front frame connected to the tray; and an outlet formed in the front frame, wherein the gas discharge portion communicates with the outlet.

11. The battery pack of claim 1, wherein the cooling pipe is not in direct fluid communication with the cooling liquid receiver.

* * * * *